United States Patent [19]
Yang

[11] 4,320,776
[45] Mar. 23, 1982

[54] CONSTRUCTION OF THE BALL BLADDER ORIFICE

[76] Inventor: Wen H. Yang, P.O. Box 562, Kaohsiung, Taiwan, 800

[21] Appl. No.: 105,592

[22] Filed: Dec. 20, 1979

[51] Int. Cl.³ .................. A63B 41/00; F16K 15/20
[52] U.S. Cl. ................................ 137/223; 273/65 C; 273/65 D; 273/65 B
[58] Field of Search ............. 273/65 C, 65 D, 65 B; 137/223

[56] References Cited

U.S. PATENT DOCUMENTS

| | | | |
|---|---|---|---|
| 1,468,273 | 9/1923 | Borden | 137/223 |
| 1,534,984 | 4/1925 | MacDonald | 273/65 D |
| 2,065,121 | 12/1936 | De Laney et al. | 273/65 D |
| 3,204,959 | 9/1965 | Nicholls | 137/223 X |

FOREIGN PATENT DOCUMENTS 449695  7/1948  Canada ........................... 137/223

Primary Examiner—George J. Marlo
Attorney, Agent, or Firm—Tak Ki Sung

[57] ABSTRACT

Disclosed herewith is a ball bladder orifice formed by a ball bladder orifice saddle, an orifice set, an inset tube and a strength washer. Since the saddle is welded to the bladder on the inside of the bladder, it will much more firmly adhere to each other than the conventional ones, wherein the saddle is attached to the bladder from the outside of the bladder. There is a hook at the bottom end of the orifice set. The hook possesses two functions: one is to hold all of the pieces stably and firmly; and, the other is to give more strength to seal the tube fissure at the lower end of the inset tube to keep the air from leaking as more air is pumped into the ball.

1 Claim, 3 Drawing Figures

CONSTRUCTION OF THE BALL BLADDER ORIFICE

BACKGROUND OF THE INVENTION

The ball bladder is used everywhere in the world. It is conventional to adhere the rubber bladder orifice to the ball bladder from outside of the bladder. Since it is made of rubber, air may leak out through the bladder. Therefore, it is easy for the bladder orifice to split away and the ball to get flat. High quality and precise techniques of adhesion are needed to keep the air from leaking out, resulting in high cost of the ball. These defects are improved in the present invention by adhering the ball bladder orifice saddle from the inside of the ball and sealing the tube fissure perfectly by the set hook. Hence medium-quality materials with strong elasticity, such as an appropriate kind of plastic, and less stringent requirements of adhesion can be applied to the present invention. Thus, the cost of the ball is lowered substantially.

SUMMARY OF THE INVENTION

It is an object of the present invention to provide a split-free construction for a ball bladder air orifice, wherein the orifice saddle is patched on the bladder on the inner side of the ball.

A further object of the present invention is to provide an improved seal to keep the air inside the ball from leaking by the set hook. Better sealing-function is achieved as more air is pumped into the ball.

A still further object of the present invention is to provide low breakage rate of the ball bladder production against the high breakage rate resulting from the outward patching.

DETAILED DESCRIPTION OF A PREFERRED EMBODIMENT

Figure 1:
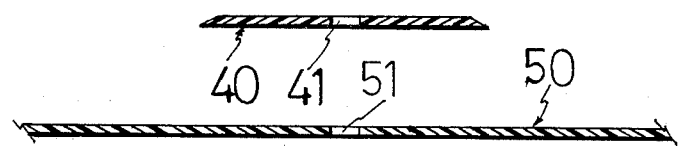
FIG. 1 is the cross-sectional views of the assembly of the preferred embodiment of the present invention.
Figure 1:
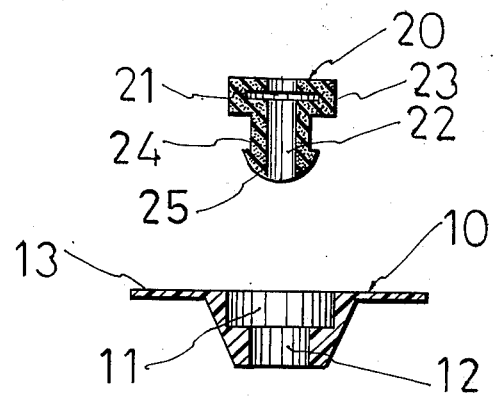

As shown in FIG. 1, the ball bladder orifice saddle 10 is hollow inside and in the shape of a truncated cone outside. The hollow portion is divided into two parts, the big saddle hole 11 having a larger diameter and the small saddle hole 12, a smaller diameter. The former is on top of the latter. At the top of the saddle 10 there is a saddle fringe 13, which is for patching on the ball bladder 50 by high-wave-cycle-heat welding treatment from the inner side of the ball.

An orifice set 20 is prepared (see FIG. 1). It is also hollowed with a uniform inner diameter except the set groove 21, has a diameter much larger than that of the set hole 22. The set head 23, with larger diameter, is on top of the set neck 24, which has a smaller diameter. The sizes of the set head 23 and set neck 24 correspond with big saddle hole 11 and small saddle hole 12, respectively. There is provided at the lower end of the orifice set 20 a set hook 25, which is in the shape of a semicircle. The set hook 25 project out of the bottom of the ball bladder orifice saddle 10 when the orifice set 20 is inserted through the ball bladder orifice saddle 10. So, the higher air pressure from inside the ball presses on the set hook 25 the stronger is the pressure stress exerted on the lower end of the inset tube 30 (see the following paragraphs). Hence, a tighter sealing function at the tube fissure 32 will be achieved (see FIG. 2).

The third piece is the inset tube 30. Tube fringe 31 is provided at about the middle of the inset tube 30. The size of tube fringe 31 corresponds with the diameter of set groove 21. In the lower end of the inset tube 30 there is a tube fissure 32 along the axis of the inset tube 30 and in the upper end there is provided a needle hole 33. The pin of the air pump (not shown in the figures) can be inserted into the needle hole 33 for pumping the air into the ball through the tube fissure 32.

A small bladder hole 51 is provided in the ball bladder 50 in order to let the inset tube 30 to get through the ball bladder 50.

A strength washer 40 is applied to the outside of the ball bladder 50 to increase the stress at this part of the ball bladder 50. At the center of the strength washer 40 a washer hole 41 is provided. It coincides with the bladder hole 51, so that the inset tube 30 can pass through the strength washer 40 and ball bladder 50 to reach the inside of the ball (see FIG. 2).

Figure 2:
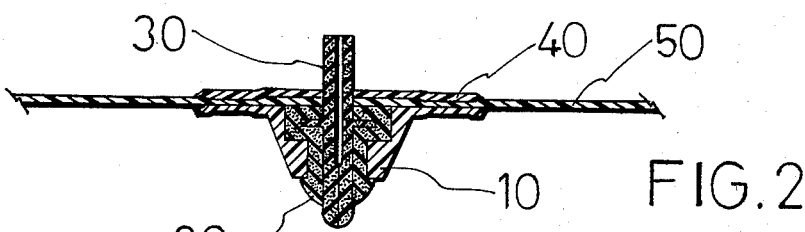
FIG. 2 is the assembled view.

The three pieces, ball bladder orifice saddle 10, orifice set 20 and inset tube 30 can be inset into one another, and assembled together as shown in FIG. 2. The saddle fringe 13 and strength washer 40 are welded by high-wave-cycle-heat treatment from both sides of the ball bladder 50. Therefore it will be extremely difficult for the air to leak out from the ball bladder 50.

Figure 3:
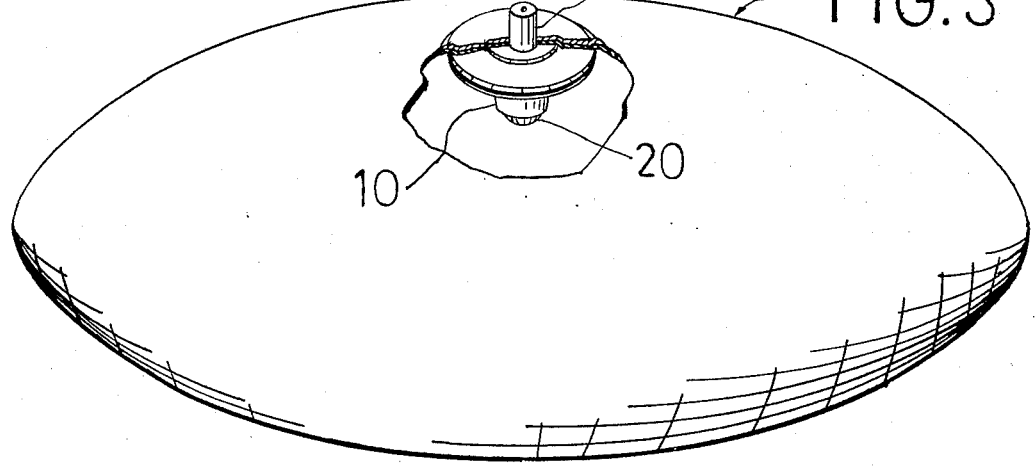
FIG. 3 is the perspective view showing the present invention is applied to an American football (rugby).

FIG. 3 shows how the present invention is applied to an American football (rugby) bladder 60.

I claim:

1. A ball bladder orifice comprising:
    an orifice saddle having a hollow body portion and a fringe portion extending radially from the top end of said body portion, the hollow body portion having two inside diameters, the larger diameter being closer to the fringe portion, the upper surface of said fringe portion being adapted for adhering to the inner surface of the ball bladder;
    an orifice set adapted for insertion into said orifice saddle, said orifice set having a head portion, a neck portion, and a rounded hook portion, said head portion having a diameter and height substantially the same as the larger diameter portion in said orifice saddle, the upper surface of said head portion adapted for adhering to the inner surface of the ball bladder, said neck portion having a diameter and height substantially the same as the smaller diameter portion in said orifice saddle, said hook portion having a diameter greater than said neck portion so that said hook portion protrudes out of the lower end of the orifice saddle, a hollow shaft extending longitudinally through the entire length of said orifice set, said shaft having an enlarged diameter in the head portion of said orifice set;
    an inset tube adapted for insertion into said orifice set, said tube having a radially extending flange on the outer periphery thereof, said inset tube being provided with a needle hole along the longitudinal axis thereof, the hole having two diameters, a larger diameter for the top portion of the tube and a fissure in the bottom portion of the tube, the diameter of the radially extending flange of the inset tube being substantially the same as the enlarged diameter of the head portion of said orifice set, the diameter of said inset tube being substantially the same as the diameter of the hollow shaft in said orifice set, the lower end of said tube extending out of the lower end of said orifice saddle;

and a strength washer having a centrally located aperture through which the top portion of the inset tube extends, the bottom surface of said washer adapted for adhering to the outside surface of the ball bladder.

* * * * *